G. W. RAY.
AUTOMOBILE AND MOTOR CYCLE TIRE.
APPLICATION FILED NOV. 8, 1921.
1,416,873.
Patented May 23, 1922.
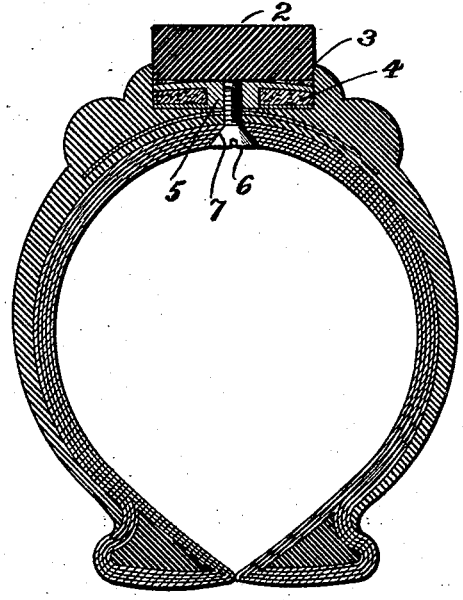
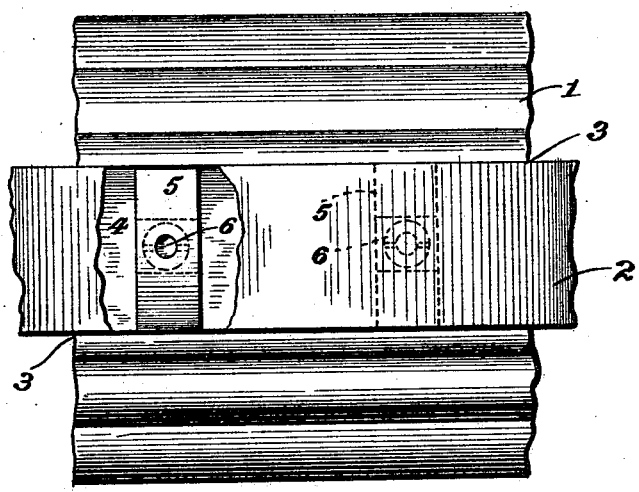
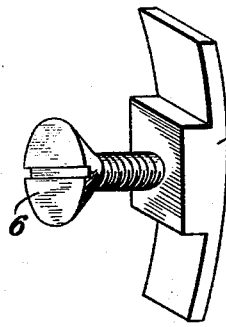
Inventor:
George William Ray.

UNITED STATES PATENT OFFICE.

GEORGE WILLIAM RAY, OF ATLANTIC CITY, NEW JERSEY.

AUTOMOBILE AND MOTOR-CYCLE TIRE.

1,416,873.  Specification of Letters Patent.  Patented May 23, 1922.

Application filed November 8, 1921. Serial No. 513,834.

*To all whom it may concern:*

Be it known that I, GEORGE WM. RAY, a subject of Great Britain, residing at Atlantic City, in the county of Atlantic and the State of New Jersey, have invented a certain new and useful Improvement in Automobile and Motor-Cycle Tires, of which the following is a specification.

My invention relates to an improvement in automobile tires in the form of a detachable rubber tread—and the means of securing it to an automobile tire made specially to receive it—an object of my invention being to produce a tire, the wearing part of which may be replaced as often as required—thereby making a great saving in tire expense.

With this and other objects in view, the invention consists in certain novel feature of construction, and combinations and arrangements of parts. As will be more fully hereinafter described and pointed out in the claim.

In the accompanying drawings Figure 1, is a cross section view of the tire and tread. Figure 2, is a plan view—Fig. 3, parts broken away is a detail perspective of the metal clamping device.

The tire comprises two parts, a body part #1, and a detachable tread part #2, the body part having a recess, #3, passing circumferentially around it, and the tread #2 being in the form of a band of the size to fit into the recess #3, in the body part #1, and of a thickness that it will protrude beyond the surface of the body, thereby taking the wear from the body part #1.

The tread is composed of an outer layer of rubber #2 and backed by fabric #4, and having embedded between the rubber and fabric, a number of metal clamps #5 tapped to take a screw #6 set at regular distances apart, the tread being in the form of a flexible flat strip.

The tire has a circumferential recess passing around the outer central portion of the tire, and having a series of holes #7 pierced along the centre of the recess, at regular spaced intervals corresponding with the metal clamps, embedded in the tread.

Flat headed screws #6, passed through these holes are used to bolt the tire #1, and tread #2 securely together. The two loose ends of the tread being finally cemented or vulcanized together. A tread is formed that can be quickly replaced by a new one, when it becomes worn.

Having thus described my invention, what I claim as new and desire to secure by Letters Patent is—

A tire having a recess passing circumferentially around its outer surface and having holes pierced through the center of the tire recess at regular spaced intervals, a tread composed of an outer layer of rubber and a backing of fabric and having embedded between the said rubber and fabric, metal clamps tapped to receive a screw, the object being to pass the screws through the holes in the tire and into the clamps in the tread so binding the tread securely in the recess of the tire.

In testimony whereof I have signed my name to this specification in the presence of two subscribing witnesses.

GEORGE WILLIAM RAY.

Witnesses:
  WILLIAM RICHARD DEKAY,
  MARVEL MILLER DEKAY.